US012016465B2

(12) United States Patent
Shan et al.

(10) Patent No.: US 12,016,465 B2
(45) **Date of Patent: *Jun. 25, 2024**

(54) ELECTRIC ADJUSTABLE BED

(71) Applicant: Keeson Technology Corporation Limited, Zhejiang (CN)

(72) Inventors: Huafeng Shan, Zhejiang (CN); Joseph Ermalovich, Santa Barbara, CA (US); Chuanxiang Ji, Zhejiang (CN); Jinchun Yan, Zhejiang (CN); Thomas James Wells, Palm Desert, CA (US)

(73) Assignee: Keeson Technology Corporation Limited, Jiaxing (CN)

( * ) Notice: Subject to any disclaimer, the term of this patent is extended or adjusted under 35 U.S.C. 154(b) by 329 days.

This patent is subject to a terminal disclaimer.

(21) Appl. No.: 17/188,856

(22) Filed: Mar. 1, 2021

(65) Prior Publication Data

US 2021/0177154 A1 Jun. 17, 2021

Related U.S. Application Data

(63) Continuation of application No. 15/752,578, filed as application No. PCT/CN2017/091192 on Jun. 30, 2017, now Pat. No. 10,932,583.

(30) Foreign Application Priority Data

Aug. 31, 2016 (CN) ......................... 201610785548.0

(51) Int. Cl.
*A47C 20/04* (2006.01)
*A47C 19/04* (2006.01)
(Continued)

(52) U.S. Cl.
CPC ............ *A47C 20/041* (2013.01); *A47C 19/04* (2013.01); *A61G 7/015* (2013.01); *A61G 7/018* (2013.01); *A61G 7/065* (2013.01)

(58) Field of Classification Search
CPC ....... A47C 20/041; A47C 19/04; A47C 19/12; A61G 7/015; A61G 7/018; A61G 7/065;
(Continued)

(56) References Cited

U.S. PATENT DOCUMENTS 3,766,912 A * 10/1973 Daniels ................ A61H 1/0292
606/242
4,376,316 A * 3/1983 Mercier ............... A47C 20/041
5/616

(Continued)

FOREIGN PATENT DOCUMENTS

CN 1380826 A 11/2002
CN 101579178 A 11/2009

(Continued)

OTHER PUBLICATIONS

Office Action issued from Chinese Patent Office in Application No. 2016-1078554.0, dated Aug. 25, 2022 (20 pages).

*Primary Examiner* — Myles A Throop
(74) *Attorney, Agent, or Firm* — Finnegan, Henderson, Farabow, Garrett & Dunner LLP

(57) ABSTRACT

Disclosed is an electric bed with an adjustable bed length, containing an upper head bed frame, an upper foot bed frame, a lower bed frame, and a plurality of bedboards with at least one pivotable relative to the lower bed frame. At least one of the upper head bed frame and the upper foot bed frame is fixed/immobile while the other contains a moving component to move between a rest position and an extension position. At least one pivotable bedboard keeps horizontal and the upper head bed frame is away from the upper foot bed frame by Distance 1 at the rest position, while the at least one pivotable bedboard pivots and there is Distance 2 longer than Distance 1 between the upper head bed frame and the upper foot bed frame at the extension position.

16 Claims, 7 Drawing Sheets

(51) Int. Cl.
*A61G 7/015* (2006.01)
*A61G 7/018* (2006.01)
*A61G 7/065* (2006.01)

(58) Field of Classification Search
CPC ........ A61G 7/002; A61G 13/08; A61G 7/104; A61G 2203/74
See application file for complete search history.

(56) References Cited

U.S. PATENT DOCUMENTS

| | | | | |
|---|---|---|---|---|
| 6,076,209 | A * | 6/2000 | Paul | A61G 7/0509 5/942 |
| 6,393,641 | B1 | 5/2002 | Hensley | |
| 6,640,365 | B1 | 11/2003 | Chang | |
| 7,285,128 | B1 * | 10/2007 | Danzey | A61H 1/0218 606/245 |
| 8,069,513 | B2 * | 12/2011 | Turner | A61G 7/07 5/613 |
| 8,806,682 | B2 * | 8/2014 | Hornbach | A61G 7/018 5/619 |
| 10,463,164 | B2 * | 11/2019 | Kramer | A47C 20/08 |
| 10,506,884 | B2 * | 12/2019 | Kramer | A47C 21/006 |
| 10,602,851 | B2 * | 3/2020 | Xu | A47C 20/041 |
| 10,912,391 | B2 * | 2/2021 | Wang | A61G 7/0506 |
| 10,932,583 | B2 * | 3/2021 | Shan | A61G 7/015 |
| 2002/0178502 | A1 * | 12/2002 | Beasley | A61G 7/015 5/618 |
| 2008/0000027 | A1 | 1/2008 | Clenet | |
| 2008/0000028 | A1 * | 1/2008 | Lemire | A61G 7/053 5/722 |
| 2008/0276373 | A1 * | 11/2008 | Clenet | A47C 21/026 5/618 |
| 2010/0325799 | A1 * | 12/2010 | Huang | A61G 7/015 5/616 |
| 2014/0352068 | A1 * | 12/2014 | Xu | A61G 7/015 5/616 |

FOREIGN PATENT DOCUMENTS

| | | | |
|---|---|---|---|
| CN | 201481696 | U | 5/2010 |
| CN | 203416995 | | 2/2014 |
| CN | 203693024 | U | 7/2014 |
| CN | 203852509 | U | 10/2014 |
| CN | 205031456 | | 2/2016 |
| CN | 205031456 | U | 2/2016 |
| CN | 105682512 | A | 6/2016 |
| CN | 206576620 | U | 10/2017 |
| EP | 1163866 | A1 | 12/2001 |

* cited by examiner

ELECTRIC ADJUSTABLE BED

CROSS-REFERENCE TO RELATED PATENT APPLICATIONS

This application is a continuation of U.S. application Ser. No. 15/752,578, filed on Feb. 13, 2018, which is a National Stage Entry of International Application No. PCT/CN2017/091192, filed Jun. 30, 2017, which claims priority from Chinese Patent Application No. 201610785548.0, filed Aug. 31, 2016. The contents of the above-referenced applications are expressly incorporated herein by reference.

FIELD OF THE INVENTION

The instant invention relates to an electric adjustable bed, especially to an electric bed with an adjustable bed length.

BACKGROUND OF THE INVENTION

It is well known that an electric adjustable bed contains a bed frame, pivotable bedboards and electric motors. The electric motors drive and move the bedboards to desired bed body postures.

In a traditional electric adjustable bed, the bedboards are hinged in end-to-end relation. Although the bed may have its bed body posture adjusted, the bed length may be shortened and the mattress may thus be protruding when some of the bedboards pivot to some extent.

The defect as mentioned above brings the bed a bad Jook, and the protruding part of the mattress is not supported by any bedboard, resulting in a shorter service life of the mattress.

SUMMARY OF THE INVENTION

The instant invention aims to overcome one or more defects as found in the prior art.

The present invention provides an electric bed with an adjustable bed length. The electric bed with an adjustable bed length contains an upper bed frame, a lower bed frame, and a plurality of bedboards mounted on the upper bed frame, wherein at least one of the plurality of bedboards is pivotable relative to the lower bed frame. In particular, the upper bed frame contains an upper head bed frame and an upper foot bed frame, which two are separated from each other. Either of the upper head bed frame and the upper foot bed frame is fixed relative to the lower bed frame while the other contains a moving component which moves back and forth, relative to the lower bed frame, between a rest position and an extension position in accordance with the pivoting angle of the at least one pivotable bedboard. When the moving component is located at the rest position, the at least one pivotable bedboard keeps horizontal and the upper head bed frame is away from the upper foot bed frame by Distance 1. When the moving part is located at the extension position, the at least one pivotable bedboard pivots and there is Distance 2 between the upper head bed frame and the upper foot bed frame. Distance 2 is longer than Distance 1. The bed length is adjusted in the above-mentioned way to make up for the lost length due to the pivoting movement of the at least one pivotable bedboard.

The at least one pivotable bedboard may be a head bedboard, and the electric adjustable bed may further contain: a head drive motor for driving the head bedboard to pivot, a head bedboard pivoting component, whose one end is hinged to the head drive motor and at least another end is hinged to the head bedboard so as to pivot the head bedboard with the driving force from the head drive motor, and a head bedboard connecting rod, whose one end is hinged in the lower bed frame and the other end is hinged in the head bedboard, wherein the moving component moves back and forth, relative to the lower bed frame, between a rest position and an extension position according to the pivoting angle of the head bedboard connecting rod.

With the arrangement mentioned above, when the head drive motor drives the head bedboard pivoting component to pivot the head bedboard, the head bedboard connecting rod has to pivot on its one end that is hinged in the lower bed frame so that the upper head bed frame is pulled by the head bedboard connecting rod and thus move towards the head of the bed. As a result, the upper head bed frame and the upper foot bed frame are further apart, so as to make up for the lost length of the bed due to the pivoting movement of the head bedboard.

The lower bed frame may further contain a pair of guide rails in parallel, and the upper head bed frame may further contain rollers which match the guide rails.

The lower bed frame may further contain a pair of guide rails in parallel, and the upper head bed frame may further contain sliders which match the rails.

The head drive motor may be hinged to the head bedboard pivoting component at one end and hinged in the lower bed frame at the other end.

The head drive motor may be hinged to the head bedboard pivoting component at one end and hinged to the upper foot bed frame at the other end.

A head fixing bedboard may be fixed on the upper head bed frame and hinged to the head bedboard, and a foot fixing bedboard may be fixed on the upper foot bed frame, with a backing plate disposed below the space between these two fixing bedboards. The arrangement of the backing plate provides a pleasing appearance for the bed and reduces the chance of falling over for a user before a mattress is mounted on the bedboards.

A foot fixing bedboard may be fixed on the upper foot bed frame and hinged to a thigh bedboard, and the thigh bedboard may have its one end hinged to the foot fixing bedboard and the other end hinged to a foot bedboard. The upper foot bed frame may further contain: a foot drive motor for driving the thigh bedboard to pivot, a thigh bedboard pivoting component, whose one end is hinged to the foot drive motor and the other end is hinged to the lower bed frame so as to pivot the thigh bedboard with the driving force from the foot drive motor, and a foot bedboard connecting rod, whose one end is hinged to the lower bed frame and the other end is hinged to the foot bedboard. With such arrangements, not only the bead bedboard, but also the thigh and foot bedboards may have their positions adjusted.

The outer surfaces of the upper head and foot bed frames may be furnished with soft material to prevent a user from badly crashing into the bed frame.

Distance 1 is not shorter than 25 millimeters so that hands may not be stuck by the two upper bed frames during the assembling process.

The electric bed of the instant invention with an adjustable length has overcome the defect in the traditional electric bed where the bed length is shortened after the posture of the bed is changed, causing part of the mattress to have no support basis. In contrast, the electric bed of the present invention, with a simple structure, is working reliably with an always pleasing appearance and can be conveniently assembled with a low risk of hand stuck.

BRIEF DESCRIPTION OF THE DRAWINGS

Those skilled in the art will appreciate that all the features, modification and/or specified embodiments can be combined in ways, unless obviously contradictory or incompatible.

Further features and advantages of the present invention will become apparent from the following detailed exemplary and non-limiting embodiments and drawings.

DETAILED DESCRIPTION OF THE INVENTION

It will be understood that the drawings are not necessarily to scale, presenting a somewhat simplified representation of various preferred features illustrative of the basic principles of the invention. The specific design features of the present invention as disclosed herein, such as specific dimensions, orientations, locations, and shapes, will be determined in part by the particular intended application and use environment.

The term "horizontal position" refers to a posture of the bedboard when it is in parallel with the ground.

The term "pivoting position" refers to a posture of the bedboard when it pivots to some extent relative to the ground.

The present invention will be described in detail with reference to the embodiments and drawings. In the figures, a certain reference number refers to the same or equivalent part throughout the drawings.

Figure 1:
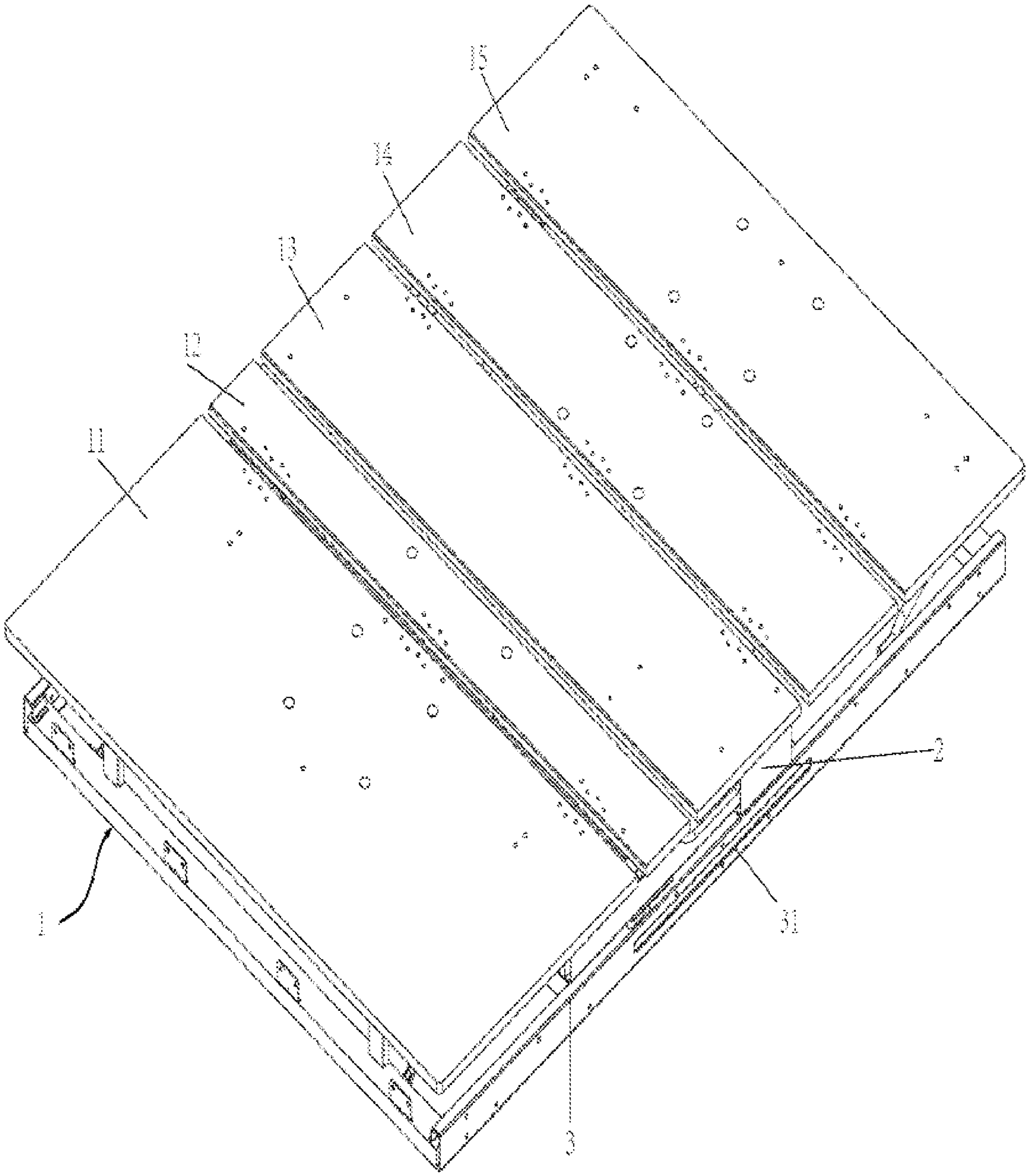
FIG. 1 is a perspective view of an electric bed with an adjustable bed length according to one embodiment of the present invention, where all the bedboards are in the flat position.
Figure 2:
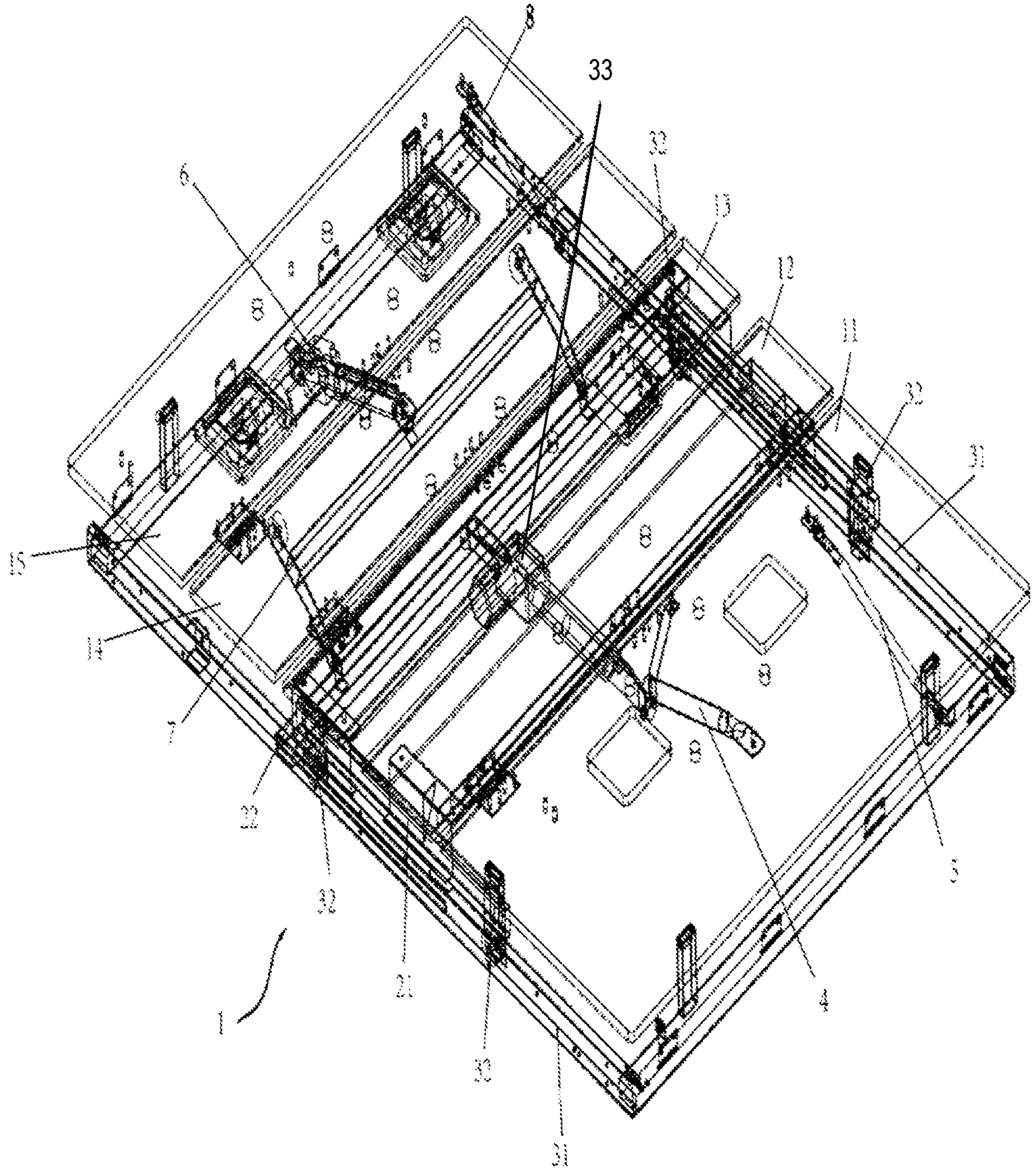
FIG. 2 is a perspective view of the bedboards as shown in FIG. 1.
Figure 3:
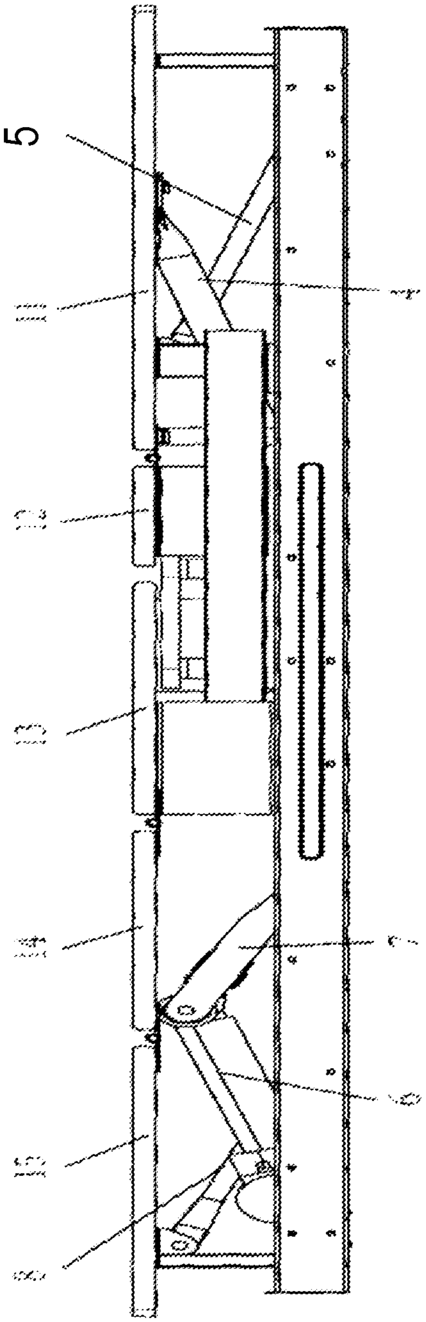
FIG. 3 is a longitudinal sectional view through the bed as shown in FIG. 1.

FIGS. 1-3 are perspective views of an electric bed 1 with an adjustable bed length according to one embodiment of the present invention, where all the bedboards are in the flat position.

Figure 4:
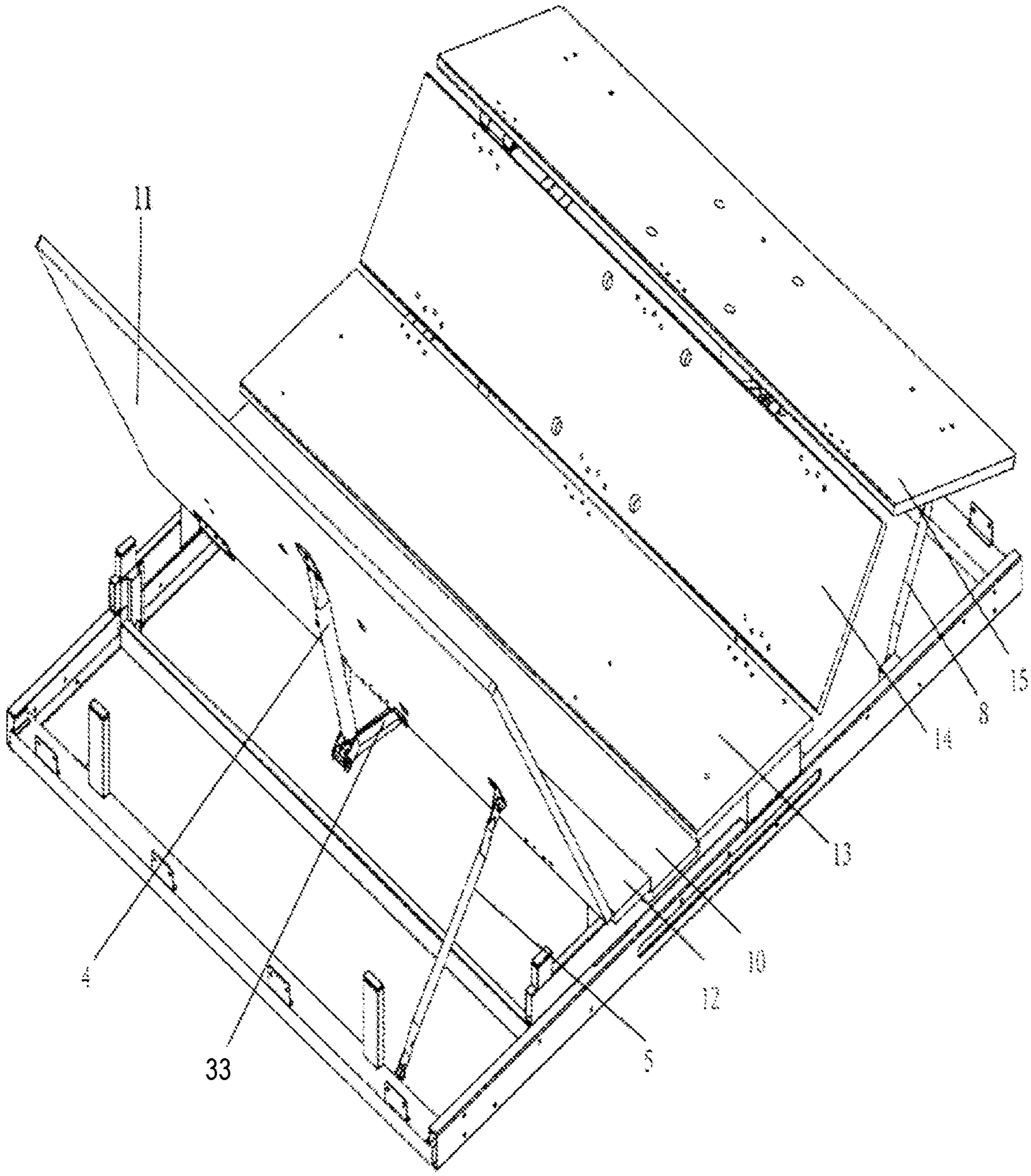
FIG. 4 is a perspective view of the electric bed of FIG. 1 where the head bedboard is pivoted.
Figure 5:
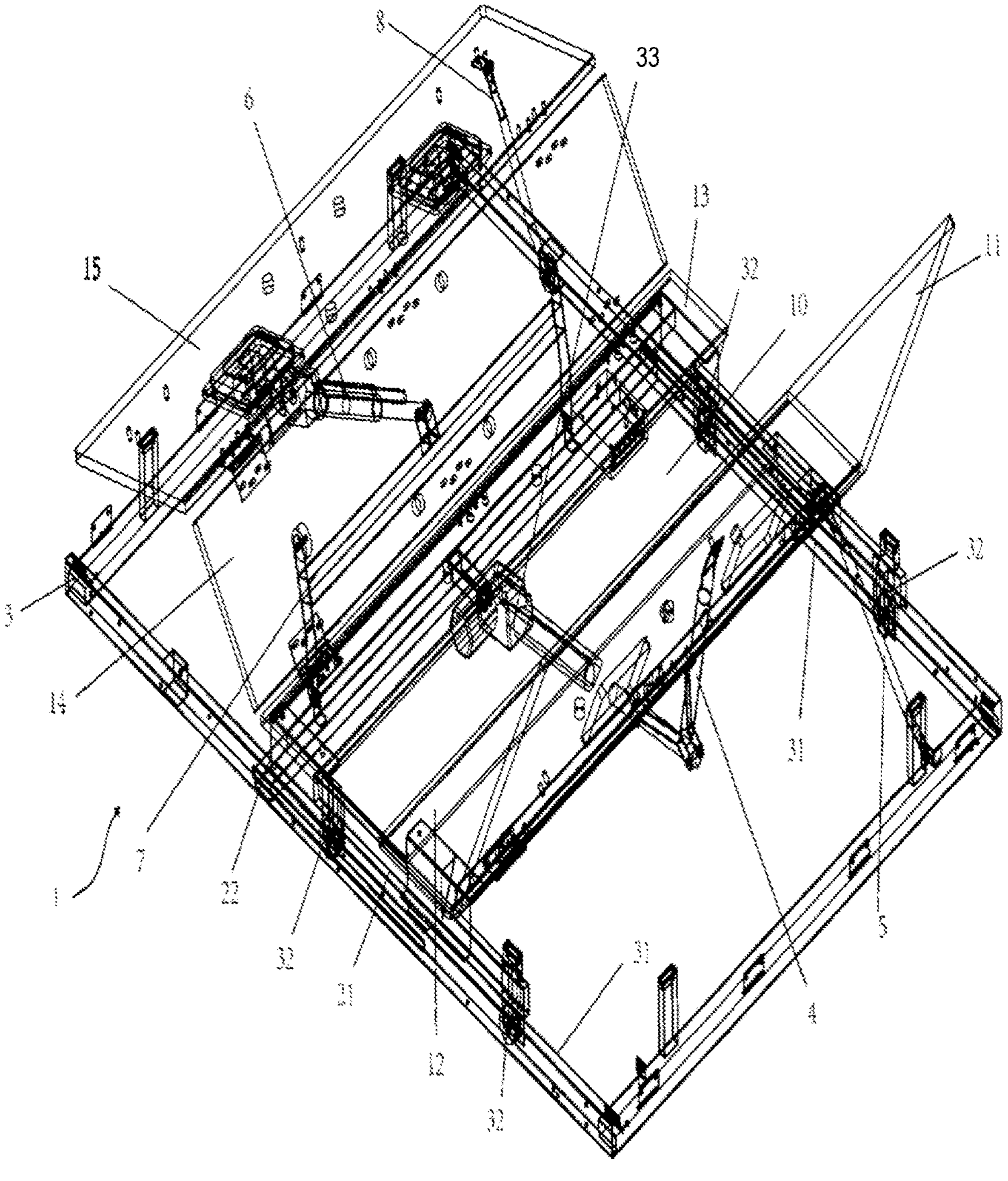
FIG. 5 is a perspective view of the bedboards as shown in FIG. 4.
Figure 6:
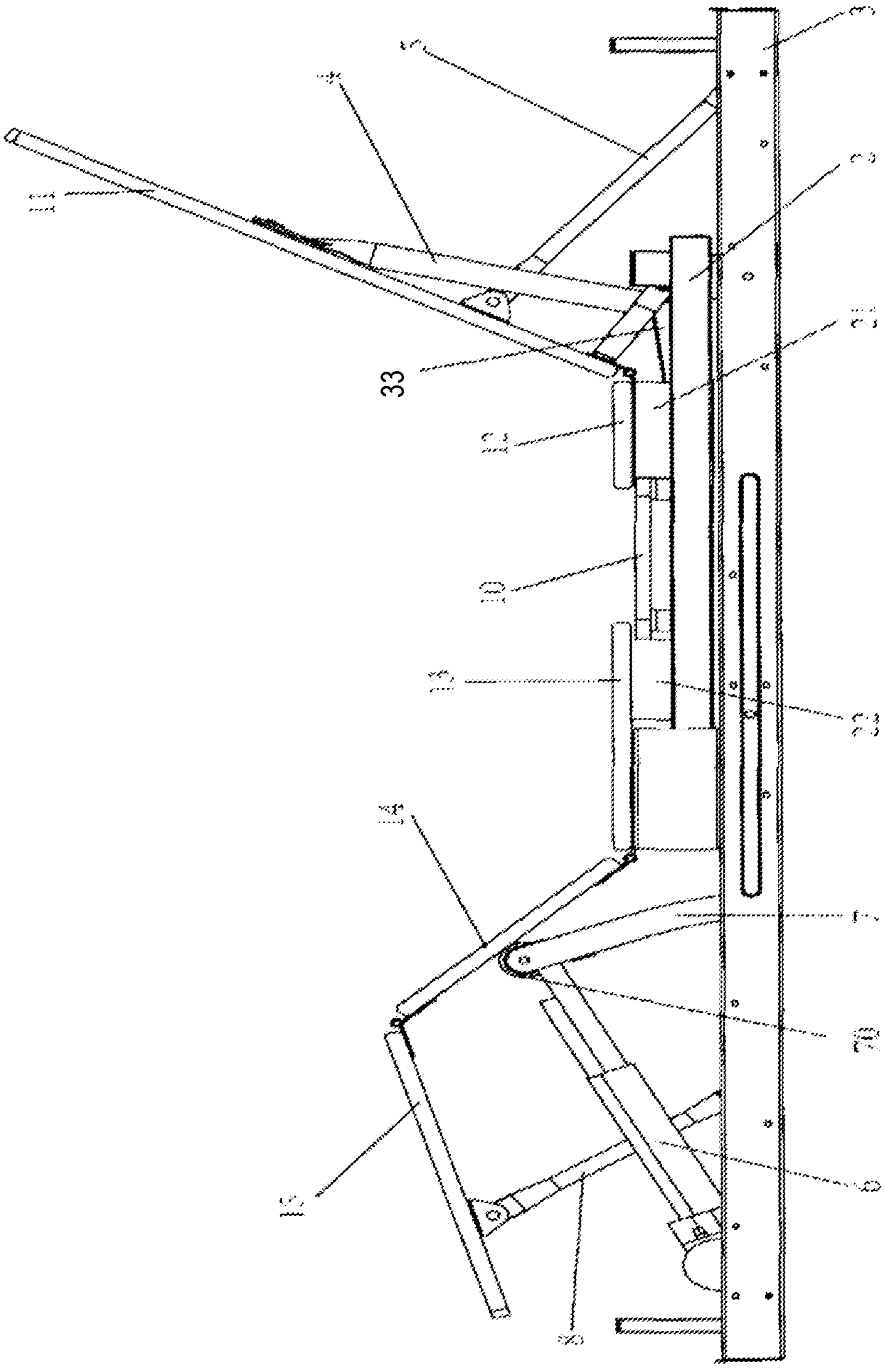
FIG. 6 a longitudinal sectional view through the bed shown in FIG. 4.

FIGS. 4-6 are perspective views of an electric bed 1 with an adjustable bed length according to one embodiment of the present invention, where a head bedboard 11 is in a titled position while a thigh bedboard 14 and a foot bedboard 15 are in their respective pivoted positions.

An electric bed with an adjustable length according to one embodiment of the present invention contains an upper bed frame 2, a lower bed frame 3, and a plurality of bedboards mounted on the upper bed frame 2.

The upper bed frame 2 contains an upper head bed frame 21 and an upper foot bed frame 22, which two are separated from each other. The upper foot bed frame 22 is fixed/immobile relative to the lower bed frame 3 while the upper head bed frame 21 moves back and forth, relative to the lower bed frame 3, between a rest position and an extension position through a moving component.

The plurality of bedboards include a head bedboard 11, a head fixing bedboard 12, a foot fixing bedboard 13, a thigh bedboard 14 and a foot bedboard 15, which are disposed from the head to the foot of the bed in said order.

The head fixing bedboard 12 is fixed on the upper head bed frame 21 and hinged to the head bedboard 11 by a first hinge, and the head bedboard 11 can pivot on the first hinge relative to the head fixing bedboard 12.

The foot fixing bedboard 13 is fixed on the upper foot bed frame 22 and hinged to the thigh bedboard 14 by a second hinge, and the thigh bedboard 14 has one end hinged to the foot fixing bedboard 13 and the other end hinged to the foot bedboard 15 by a third hinge. The thigh bedboard 14 may pivot on the second hinge relative to the foot fixing bedboard 13 while the foot bedboard 15 pivots to the thigh bedboard 14 at the third hinge.

The electric bed 1 further contains a head drive motor 33, a head bedboard pivoting component 4 and a head bedboard connecting rod 5.

The head drive motor 33, such as a push rod motor or linear motor, is used for driving the head bedboard 11 to pivot, wherein one end of the head drive motor is hinged to an intermediate section of the lower bed frame 3 and the other end may extend as needed. Alternatively, the head drive motor 33 may be hinged to an intermediate section of the upper foot bed frame 22 instead of the intermediate section of the lower bed frame.

The head bedboard pivoting component 4 has one end hinged to the extendable end of the head drive motor 33 and at least has another end hinged to the head bedboard 11 so as to pivot the head bedboard 11 with the driving force from the head drive motor 33. In particular, the head bedboard pivoting component 4 may be hinged to the extendable end of the head drive motor 33 together with a supporting component hinged to the head bedboard 11. The supporting component may be used as a bracket to improve the reliability of the head bedboard pivoting component 4.

The head bedboard connecting rod 5 has one end hinged to the lower bed frame 3 and the other end hinged to the head bedboard 11. The head bedboard connecting rod 5 pivots on its one end hinged to the lower bed frame 3 as the head bedboard 11 pivots, and the upper bed frame 21 moves accordingly through the moving component relative to the lower bed frame 3.

Specifically, the lower bed frame 3 contains a pair of parallel guide rails 31. The pair of guide rails, together with two cross members, form a rectangular frame to create the lower bed frame 3. The moving component of the upper head bed frame 21 is rollers 32 which match the pair of guide rails 31 of the lower bed frame 3. The upper head bed frame 21 contains at least four rollers 32 that can roll along the pair of guide rails 31. The rollers 32 in the upper head bed frame 21 move, relative to the lower bed frame 3, between the rest position and the extension position in accordance with the pivoting angle of the head bedboard connecting rod 5. When the rollers are located at the rest position, the head bedboard 11 keeps horizontal and the upper head bed frame 21 is away from the upper foot bed frame 22 by Distance 1 L1. When the rollers are located at the extension position, the head bedboard 11 is in a pivoted position and there is Distance 2 L2 between the upper head bed frame 21 and the upper foot bed frame 22. Distance 2 L2 is longer than Distance 1 L1. The bed length is adjusted in the above-mentioned way.

Distance 1 is not shorter than 20 millimeters, preferably not shorter than 25 millimeters, so as to provide a low risk of hand stuck during the assembling process. Distance 2 is not longer than 188 millimeters. Alternatively, the moving component of the upper head bed frame 21 is sliders matching the pair of guide rails 31 of the lower bed frame 3.

In a preferable embodiment, a backing plate 10 is disposed below the space between the head fixing bedboard 12 and the foot fixing bedboard 14, the width of the backing plate 10 being slightly narrower than that of the bedboards, and the length of the backing plate 10 being not shorter than Distance 1 L1, preferably not shorter than Distance 2 L2.

The upper foot bed frame 22 may further contain a foot drive motor 6, a thigh bedboard pivoting component 7 and a foot bed board connecting rod 8.

The foot drive motor 6, such as a push rod motor or linear motor, is used for driving the thigh bedboard 14 to pivot, wherein one end of the foot drive motor is hinged to an intermediate section of the lower bed frame 3 near the foot of the bed and the other end may extend as needed. The foot drive motor 6 and the head drive motor 4 extend in the same direction.

The thigh bedboard pivoting component 7 has one end hinged to the foot drive motor 6 and the other end hinged to the lower bed frame 3 so as to pivot the thigh bedboard 14 with the driving force from the foot drive motor 6. Alternatively, one end of the thigh bedboard pivoting component 7 is hinged to foot drive motor 6, and another end is installed with a roller 70. When the extendable end of the foot drive motor 6 extends, the end of the thigh bedboard pivoting component 7 with the roller 70 rolls along the bottom surface of the thigh bedboard 14 to jack up the thigh bedboard 14 to pivot.

The foot bedboard connecting rod 8 has one end hinged to the lower bed frame 3 and the other end hinged to the foot bedboard 15. As the thigh bedboard 14 pivots, the foot bedboard 15 hinged to the thigh bedboard 14 moves along with the thigh bedboard 14. Accordingly, with the movement of the foot bedboard 15, the foot bedboard connecting rod 8 pivots on its end hinged to the lower bed frame 3 to support the foot bedboard 15 on a required position.

Preferably, the outer surfaces of the upper head bed frame 21 and the upper foot bed frame 22 are furnished with soft material. In this way, the head bedboard 11 and the head fixing bedboard 12, both mounted on the upper head bed frame 21, are packed and integrated together, and the foot fixing bedboard 13 is packed and integrated with the thigh bedboard 14 and the foot bedboard 15, all mounted on the upper foot bed frame 22, providing a pleasing bed appearance. Also, as the upper head bed frame 21 and the upper foot bed frame 22 made of hard material are now furnished with soft material, less pain will be caused if a user hits on the bed frame by accident, improving safety performance.

Figure 7:
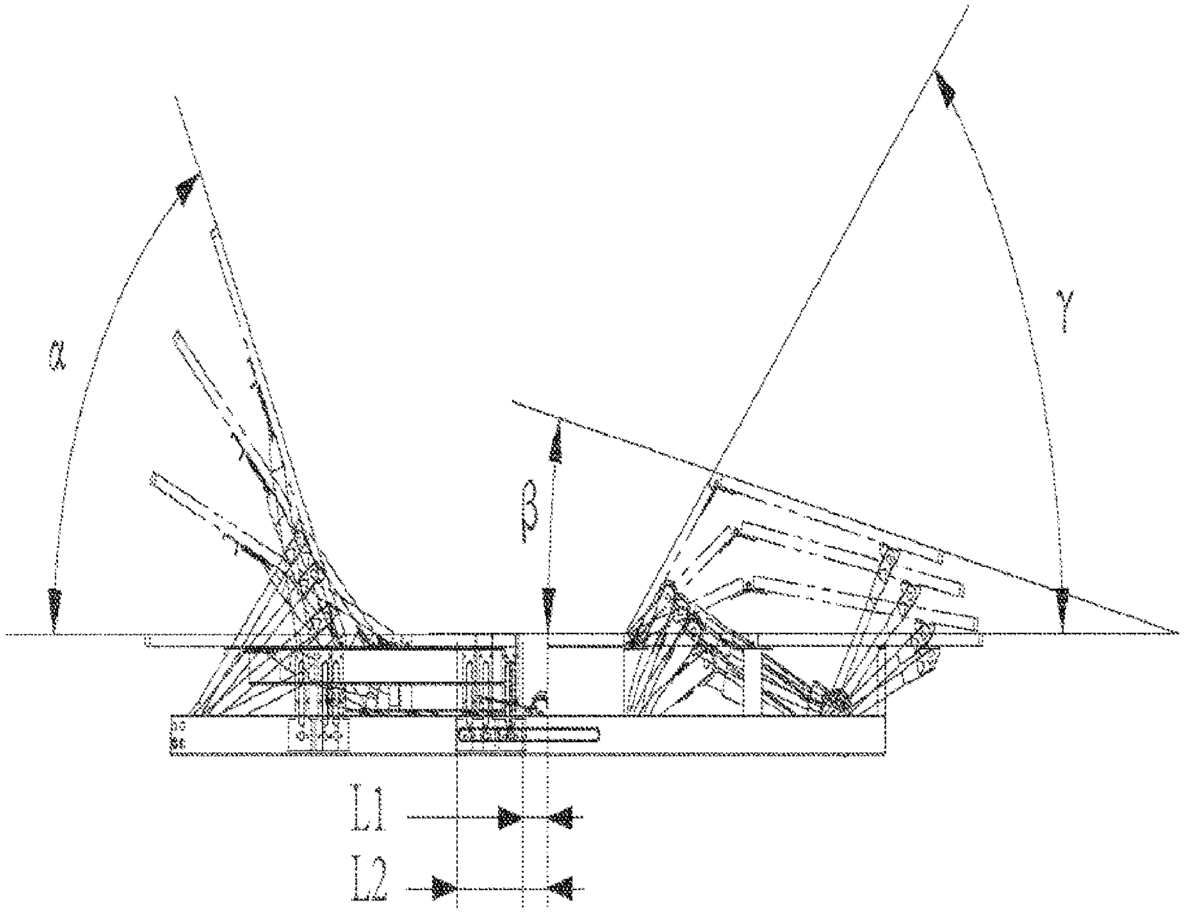
FIG. 7 is a longitudinal sectional view through an electric bed according to one embodiment of the present invention, showing the changing contours of the postures of the bed with the bedboards in different positions.

FIG. 7 is a longitudinal sectional view through an electric bed according to one embodiment of the present invention, showing the changing contours of the postures of the bed with the bedboards in different positions. When the head bedboard 11 pivots, the angle $\alpha$ between the bedboard plane and the horizontal plane cannot be larger than 60 degrees. When the thigh bedboard 14 pivots, the angle $\gamma$ between the bedboard plane and the horizontal plane cannot be larger than 45 degrees. When the foot bedboard 15 pivots along with the thigh bedboard 14, the angle $\beta$ between the bedboard plane and the horizontal plane cannot be larger than 12.5 degrees.

In another embodiment, the electric bed of the present invention with an adjustable length contains an upper bed frame, a lower bed frame, and a plurality of bedboards mounted on the upper bed frame.

The upper bed frame contains an upper head bed frame and an upper foot bed frame, which two are separated from each other. The upper head bed frame is fixed/immobile relative to the lower bed frame while the upper foot bed frame moves back and forth, relative to the lower bed frame, between a rest position and an extension position through a moving component.

The plurality of bedboards include a head bedboard, a head fixing bedboard, a foot fixing bedboard, and a thigh bedboard, which are disposed from the head to the foot of the bed in said order.

The head fixing bedboard is fixed on the upper head bed frame and hinged to the head bedboard by a fourth hinge, and the head bedboard is pivotable on the fourth hinge relative to the upper head bed frame.

The foot fixing bedboard is fixed on the upper foot bed frame and hinged to the thigh bedboard by a fifth hinge, and the thigh bedboard is pivotable on the fifth hinge relative to the upper foot bed frame.

The electric bed further contains a foot drive motor, a thigh bedboard pivoting component and a thigh bedboard connecting rod.

The foot drive motor, such as a push rod motor or linear motor, is used for driving the thigh bedboard to pivot, wherein one end of the foot drive motor is hinged to an intermediate section of the lower bed frame and the other end may extend as needed. Alternatively, the foot drive motor may be hinged to an intermediate section of the upper head bed frame instead of the intermediate section of the lower bed frame.

The thigh bedboard pivoting component has one end hinged to the extendable end of the foot drive motor and at least has another end hinged to the thigh bedboard so as to pivot the thigh bedboard with the driving force from the foot drive motor. In particular, the thigh bedboard pivoting component may be hinged to the extendable end of the foot drive motor together with a supporting component hinged to the thigh bedboard. In this way, the supporting component is used as a bracket to improve the reliability of the thigh bedboard pivoting component.

The thigh bedboard connecting rod has one end hinged to the lower bed frame and the other end hinged to the thigh bedboard. The thigh bedboard connecting rod pivots on its one end hinged to the lower bed frame as the thigh bedboard pivots, and accordingly move upper foot bed frame through the moving component relative to the lower bed frame.

In particular, the lower bed frame contains a pair of parallel guide rails. The pair of guide rails, together with two cross members, form a rectangular frame to create the lower bed frame. The moving component of the upper foot bed frame is rollers which match the pair of guide rails of the lower bed frame. The upper foot bed frame contains at least four rollers that can roll along the pair of guide rails. The rollers in the upper foot bed frame move, relative to the lower bed frame, between the rest position and the extension position in accordance with the pivoting angle of the thigh bedboard connecting rod. When the rollers are located at the rest position, the thigh bedboard keeps horizontal and the upper head bed frame is away from the upper foot bed frame by Distance 1. When the rollers are located at the extension position, the thigh bedboard is in a pivoted position and there is Distance 2 between the upper head bed frame and the upper foot bed frame. Distance 2 is longer than Distance 1. The bed length is adjusted in the above-mentioned way. Distance 1 is not shorter than 20 millimeters, preferably not shorter than 25 millimeters, to provide a low risk of hand stuck during the assembling process. Distance 2 is not longer than 188 millimeters. Alternatively, the moving component of the upper foot bed frame is sliders matching the pair of guide rails of the lower bed frame.

The upper head bed frame may further contain a head drive motor, and a head bedboard pivoting component.

The bead drive motor, such as a push rod motor or linear motor, is used for driving the head bedboard to pivot, wherein one end of the head drive motor is hinged to an intermediate section of the lower bed frame near the foot of the bed and the other end may extend as needed. The head drive motor and the foot drive motor extend in the same direction.

The head bedboard pivoting component has one end hinged to the head drive motor and the other end hinged to the lower bed frame so as to pivot the head bedboard with the driving force from the head drive motor. Alternatively, one end of the head bedboard pivoting component is hinged to the head drive motor, and another end is installed with a roller. When the extendable end of the head drive motor extends, the end of the head bedboard pivoting component with the roller rolls along the bottom surface of the head bedboard to jack up the head bedboard to pivot. The foregoing embodiments are exemplary, and the present invention is not limited thereto. On the basis of these embodiments, those skilled in the art will know other embodiments having the same performance, without departing from the sprit and scope of the present invention.

Many embodiments and variations are apparent to those skilled in the art. Especially, the features, modification and/or specified embodiments described above can be combined in many ways, unless obviously contradictory or incompatible. All the embodiments and variations fall within the scope of the present invention.

We claim:

1. An electric adjustable bed, comprising:

an upper bed frame, a lower bed frame, and a plurality of bedboards mounted on the upper bed frame, including at least one pivotable bedboard pivotable relative to the lower bed frame, wherein the lower bed frame includes a pair of guide rails, the pair of guide rails being parallel with one another and forming at least part of the lower bed frame, wherein the upper bed frame includes an upper head bed frame and an upper foot bed frame that are separated from each other, one of the upper head bed frame and the upper foot bed frame includes a pair of rollers that match the pair of guide rails and are configured to move along the pair of guide rails, and the other one of the upper head bed frame and the upper foot bed frame is fixed relative to the lower bed frame, wherein the pair of rollers are configured to move substantially horizontally along the pair of guide rails in the lower bed frame between a rest position and an extension position in accordance with a pivoting angle of the at least one pivotable bedboard, wherein the at least one pivotable bedboard is substantially horizontal and the upper head bed frame is spaced apart substantially horizontally from the upper foot bed frame by a first distance when the pair of rollers are located at the rest position, and wherein the at least one pivotable bedboard pivots and the upper head bed frame is spaced apart substantially horizontally from the upper foot bed frame by a second distance when the pair of rollers are located at the extension position, wherein the second distance is longer than the first distance.

2. The electric adjustable bed according to claim 1, wherein the at least one pivotable bedboard is a head bedboard, and the electric adjustable bed further comprises:

a head drive motor for driving the head bedboard to pivot, a head bedboard pivoting component, one end of which is hinged to the head drive motor and at least another end is coupled to the head bedboard so as to pivot the head bedboard with the driving force from the head drive motor, and a head bedboard connecting rod, one end of which is hinged to an intermediate section of the lower bed frame and the other end is hinged to an intermediate section of the head bedboard, wherein the pair of rollers move back and forth, relative to the lower bed frame, between the rest position and the extension position in accordance with a pivoting angle of the head bedboard connecting rod.

3. The electric adjustable bed according to claim 2, wherein the head drive motor is hinged to the head bedboard pivoting component at one extendable end and hinged in the lower bed frame at the other end.

4. The electric adjustable bed according to claim 2, wherein the head drive motor is hinged to the head bedboard pivoting component at one extendable end and hinged in the upper foot bed frame at the other end.

5. The electric adjustable bed according to claim 2, wherein a head fixing bedboard is fixed on the upper head bed frame and hinged to the head bedboard, and a foot fixing bedboard is fixed on the upper foot bed frame, with a backing plate being disposed below the space between the head fixing bedboard and the foot fixing bedboard.

6. The electric adjustable bed according to claim 5, wherein a width of the backing plate is narrower than that of the head bedboard, the head fixing bedboard, the foot fixing bedboard, the thigh bedboard, and the foot bedboard, and a length of the backing plate is no shorter than the first distance.

7. The electric adjustable bed according to claim 2, wherein a foot fixing bedboard is fixed on the upper foot bed frame and hinged to a thigh bedboard, the thigh bedboard having one end hinged to the foot fixing bedboard and the other end hinged to a foot bedboard, and wherein the upper foot bed frame further comprises:

a foot drive motor for driving the thigh bedboard to pivot, one end of the foot drive motor is hinged to an intermediate section of the lower bed frame near a foot of the bed and the other end of the foot drive motor is extendable;

a thigh bedboard pivoting component, one end of which is hinged to the extendable end of the foot drive motor, and another end of the thigh bedboard pivoting component is installed with a roller which is rollable along a bottom surface of the thigh bedboard, wherein when the extendable end of the foot drive motor extends, the end of the thigh bedboard pivoting component with the roller rolls along the bottom surface of the thigh bedboard so as to pivot the thigh bedboard with the driving force from the foot drive motor; and a foot bedboard connecting rod, one end of which is hinged in the lower bed frame and the other end is hinged in the foot bedboard.

8. The electric adjustable bed according to claim 1, wherein outer surfaces of the upper head bed frame and the upper foot bed frame are furnished with soft material.

9. The electric adjustable bed according to claim 1, wherein the first distance is not shorter than 25 millimeters.

10. The electric adjustable bed according to claim 1, wherein outer surfaces of the head frame member and the foot frame member are furnished with soft material.

11. An electric adjustable bed, comprising:

a first bed frame comprising a head frame member and a foot frame member separate from the head frame member, at least one of the head frame member and the foot frame member includes a pair of rollers that match a pair of parallel guide rails and are configured to move substantially horizontally along the pair of guide rails between a rest position and an extension position; and a plurality of bedboards mounted on the first bed frame, including at least one pivotable bedboard that pivots in accordance with a movement of the pair of rollers along the pair of guide rails between the rest position and the extension position, wherein, when the pair of rollers are located at the rest position, the at least one pivotable bedboard is substantially horizontal and the head frame member is spaced apart substantially horizontally from the foot frame member by a first distance, and wherein, when the pair of rollers are located at the extension position, the at least one pivotable bedboard pivots and the head frame member is spaced apart substantially horizontally from the foot frame member by a second distance longer than the first distance.

12. The electric adjustable bed according to claim 11, further comprising a second bed frame disposed below the first bed frame, wherein the pair of guide rails form at least part of the second bed frame.

13. The electric adjustable bed according to claim 12, wherein the at least one pivotable bedboard is a head bedboard, and the electric adjustable bed further comprises:

a head drive motor for driving the head bedboard to pivot, a head bedboard pivoting component comprising one end hinged to the head drive motor and at least another end coupled to the head bedboard so as to pivot the head bedboard with the driving force from the head drive motor, and a head bedboard connecting rod comprising one end hinged to an intermediate section of the second bed frame and the other end is hinged to an intermediate section of the head bedboard, wherein the pair of rollers move back and forth, relative to the second bed frame, between the rest position and the extension position in accordance with a pivoting angle of the head bedboard connecting rod.

14. The electric adjustable bed according to claim 13, wherein the head drive motor is hinged to the head bedboard pivoting component at one extendable end and hinged in the second bed frame at the other end.

15. The electric adjustable bed according to claim 13, wherein the head drive motor is hinged to the head bedboard pivoting component at one extendable end and hinged in the first foot bed frame at the other end.

16. The electric adjustable bed according to claim 13, wherein a head fixing bedboard is fixed on the first head bed frame and hinged to the head bedboard, and a foot fixing bedboard is fixed on the first foot bed frame, with a backing plate being disposed below the space between the head fixing bedboard and the foot fixing bedboard.

* * * * *